United States Patent
Back et al.

(10) Patent No.: US 11,306,217 B2
(45) Date of Patent: Apr. 19, 2022

(54) METHOD FOR BONDING SUBSTRATE AND SUBSTRATE FOR DISPLAY MANUFACTURED BY THE SAME

(71) Applicant: LG Chem, Ltd., Seoul (KR)

(72) Inventors: Seung A Back, Daejeon (KR); Joon Hyung Kim, Daejeon (KR)

(73) Assignee: LG Chem, Ltd.

( * ) Notice: Subject to any disclaimer, the term of this patent is extended or adjusted under 35 U.S.C. 154(b) by 392 days.

(21) Appl. No.: 16/327,658

(22) PCT Filed: Nov. 8, 2017

(86) PCT No.: PCT/KR2017/012568
§ 371 (c)(1),
(2) Date: Feb. 22, 2019

(87) PCT Pub. No.: WO2018/105901
PCT Pub. Date: Jun. 14, 2018

(65) Prior Publication Data
US 2020/0123399 A1    Apr. 23, 2020

(30) Foreign Application Priority Data
Dec. 8, 2016  (KR) .................. 10-2016-0167054

(51) Int. Cl.
*C09D 11/30*    (2014.01)
*B32B 37/12*    (2006.01)
(Continued)

(52) U.S. Cl.
CPC .......... *C09D 11/30* (2013.01); *B32B 37/1292* (2013.01); *B32B 38/145* (2013.01);
(Continued)

(58) Field of Classification Search
CPC ........ B32B 2310/0831; B32B 2457/20; B32B 37/1292; B32B 38/145; B41J 11/002;
(Continued)

(56) References Cited

U.S. PATENT DOCUMENTS 5,981,113 A   11/1999   Christian
6,486,936 B1  11/2002   Sugimoto
(Continued)

FOREIGN PATENT DOCUMENTS

CN    001240466 A    1/2000
CN    001854867 A    11/2006
(Continued)

OTHER PUBLICATIONS

Korean Search Report for Appln No. 2017800511117, dated Sep. 24, 2020, 3 pages.
(Continued)

*Primary Examiner* — Sonya M Sengupta
(74) *Attorney, Agent, or Firm* — Lerner, David, Littenberg, Krumholz & Mentlik, LLP

(57) ABSTRACT

The present invention relates to a method of bonding substrates and a substrate for displays manufactured by the same. In an embodiment, the method comprises (a) printing a first photocurable adhesive ink on the lower substrate to form a pattern; (b) photocuring the pattern to form a spacer on the lower substrate; (c) printing a second photocurable adhesive ink on the lower substrate, which includes the spacer, to form an adhesive layer; (d) irradiating the adhesive layer with light; and (e) laminating the upper substrate to the lower substrate via the adhesive layer, wherein the upper and lower substrates are transparent or opaque, and wherein the upper and lower substrates comprise the same or different materials.

14 Claims, 2 Drawing Sheets

(51) Int. Cl.
 *B32B 38/00* (2006.01)
 *C09D 11/101* (2014.01)
 *C09J 5/02* (2006.01)

(52) U.S. Cl.
 CPC .............. C09D 11/101 (2013.01); C09J 5/02 (2013.01); *B32B 2310/0831* (2013.01); *B32B 2457/20* (2013.01)

(58) Field of Classification Search
 CPC .. B41M 3/006; B41M 5/0047; B41M 5/0058; B41M 5/007; B41M 7/0081; C09D 11/101; C09D 11/30; C09J 2301/416; C09J 5/00; C09J 5/02
 USPC ................................ 156/272.2, 273.3, 275.5
 See application file for complete search history.

(56) References Cited

U.S. PATENT DOCUMENTS

| | | | |
|---|---|---|---|
| 7,803,420 | B2 | 9/2010 | Kim et al. |
| 7,829,180 | B2 | 11/2010 | Ushiki et al. |
| 7,907,242 | B2 | 3/2011 | Yoon |
| 8,733,917 | B2 | 5/2014 | Mataki |
| 9,892,943 | B2 * | 2/2018 | Ma ...................... B32B 38/1841 |
| 2006/0238693 | A1 | 10/2006 | Yoon |
| 2008/0124525 | A1 | 5/2008 | Ushiki et al. |
| 2009/0035535 | A1 * | 2/2009 | Wachi .................. C09D 11/101 427/256 |
| 2010/0253894 | A1 | 10/2010 | Yoon |
| 2011/0227661 | A1 | 9/2011 | Numata et al. |
| 2012/0026225 | A1 | 2/2012 | Mataki |
| 2012/0326576 | A1 | 12/2012 | Ozolins et al. |
| 2014/0235742 | A1 * | 8/2014 | Cho .................... H01L 51/5246 522/31 |
| 2014/0246148 | A1 * | 9/2014 | Liu ............................ C09J 5/00 156/60 |
| 2016/0035988 | A1 * | 2/2016 | Lee ....................... B32B 27/283 438/46 |
| 2017/0348955 | A1 * | 12/2017 | Back ..................... B32B 38/145 |

FOREIGN PATENT DOCUMENTS

| | | |
|---|---|---|
| CN | 101189124 A | 5/2008 |
| CN | 101191960 A | 6/2008 |
| CN | 102201793 A | 9/2011 |
| EP | 1886800 A1 | 2/2008 |
| JP | 2000338498 A | 12/2000 |
| JP | 2006036865 A | 2/2006 |
| JP | 2009024055 A | 2/2009 |
| JP | 2009066475 A | 4/2009 |
| JP | 2012020247 A | 2/2012 |
| JP | 2016136625 A | 7/2016 |
| KR | 20060110936 A | 10/2006 |
| KR | 20160064030 A | 6/2016 |
| KR | 20160110334 A | 9/2016 |
| TW | 201432008 A | 8/2014 |
| WO | 2006129669 A1 | 12/2006 |

OTHER PUBLICATIONS

International Search Report for PCT/KR2017/012568 dated Mar. 19, 2018.
Korean Search Report for KR20160167054 dated May 30, 2017.
Korean Search Report for KR20160167054 dated Oct. 18, 2016.

\* cited by examiner

METHOD FOR BONDING SUBSTRATE AND SUBSTRATE FOR DISPLAY MANUFACTURED BY THE SAME

CROSS-REFERENCE TO RELATED APPLICATIONS

This application is a national phase entry under 35 U.S.C. § 371 of International Application No. PCT/KR2017/012568, filed on Nov. 8, 2017, which claims priority to Korean Patent Application No. 10-2016-0167054, filed on Dec. 8, 2016, disclosures of which are incorporated herein by reference.

FIELD OF INVENTION

The present invention relates to a method for bonding substrates and a substrate for displays manufactured by the same. More particularly, it relates to a method for bonding substrates that enables adhesion between substrates by light irradiation and curing even using an opaque substrate, and a substrate for displays manufactured thereby.

BACKGROUND OF THE INVENTION

Description of the Related Art

In recent years, a material such as a functional film is attached to a substrate used for a display device or it is used as a substrate itself in order to realize various functions. In accordance with the trend toward miniaturization and high performance of electronic devices, functionalities such as lightening and simplification of electronic products have been improved. As such a substrate for a functional display, a transparent substrate of the type of glass or film is mainly used. When a transparent substrate is used, the lower substrate and the upper substrate can be bonded or laminated by photocuring by light irradiation.

PRIOR ART DOCUMENT

Patent Literature (Patent Document 1) Japanese Patent Laid-open Publication No. 2006-036865.

SUMMARY OF THE INVENTION

As described above, conventionally, transparent glass or transparent film are mainly used as substrates for functional displays, and when a transparent substrate is used, it is preferable to use a photocuring by light irradiation so that a lower substrate (more precisely, a adhesive layer formed on the lower substrate) and the upper substrate can be bonded or laminated. However, when the substrate is not transparent, transmission of the irradiated light is not easy and the adhesive layer of the lower substrate may not be cured, and consequently, the lamination of the lower substrate and the upper substrate may be incomplete. There is a need for a method for completely bonding and laminating upper and lower substrates even when using a substrate that is not transparent.

Accordingly, an object of the present invention is to provide a method of bonding a substrate, which can bond substrates by light irradiation and curing even using an opaque substrate, and a substrate for displays manufactured thereby.

In order to achieve the object, the present invention provides a method of bonding substrates which comprises (a) printing a first photocurable adhesive ink on a lower substrate to form a pattern; (b) photocuring the pattern to form a spacer on the lower substrate; (c) printing a second photocurable adhesive ink on the lower substrate, which includes the spacers disposed thereon, to form an adhesive layer, wherein the first and second curable adhesive inks are the same or different; (d) irradiating the adhesive layer with light; and (e) laminating the upper substrate and the lower substrate via the irradiated adhesive layer, wherein each of the upper substrate and the lower substrate are transparent or opaque and wherein the upper and lower substrates comprise the same or different materials.

In addition, the present invention provides a substrate for displays manufactured by a method of binding the substrates.

Effect of the Invention

According to the method for binding substrates according to the present invention and the substrate for displays manufactured by the method, it is possible to perform inter-substrate adhesion by light irradiation and curing even using an opaque substrate.

DETAILED DESCRIPTION OF THE INVENTION

Hereinafter, the present invention will be described in detail with reference to the accompanying drawings.

FIGS. 1A-F are a schematic view showing substrate adhering steps for illustrating a method of binding substrates according to an embodiment of the present invention.

The method of bonding substrates according to the present invention comprises the steps of (a) printing a first photocurable adhesive ink on a lower substrate to form a pattern; (b) photocuring the pattern to form a spacer on the lower substrate (c) printing a second photocurable adhesive ink on the lower substrate, which includes the spacers disposed thereon, to form an adhesive layer; (d) irradiating the adhesive layer formed on the lower substrate with light; and (e) laminating the upper substrate to the lower substrate via the irradiated adhesive layer, wherein the upper substrate and the lower substrate are transparent or opaque and wherein the upper and lower substrates comprise the same or different materials.

Figure 1A:
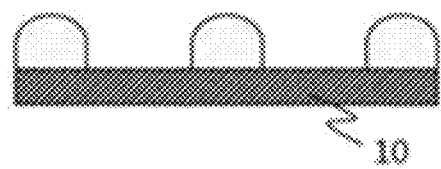
FIGS. 1A-F are a schematic view showing substrate adhering steps for illustrating a method of adhering substrates according to an embodiment of the present invention.
Figure 1B:
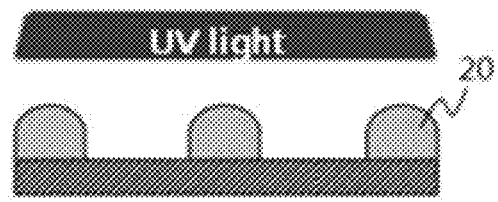
Figure 1C:
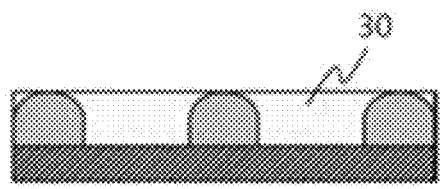
Figure 1D:
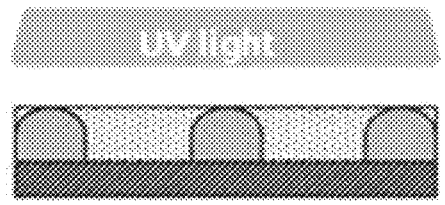
Figure 1E:
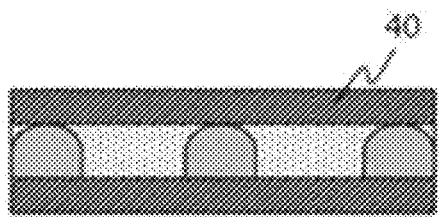
Figure 1F:
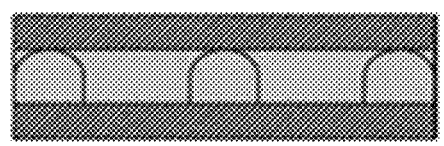

Before the method of bonding substrates according to the present invention as described above is described in detail, the steps of each step shown in FIGS. 1A-F is described. FIG. 1A shows a pattern formed by printing a photocurable adhesive ink on a lower substrate (i.e., a photocurable adhesive pattern formed through an inkjet process), FIG. 1B shows a spacer formed by curing the pattern by light irradiation, FIG. 1C shows an adhesive layer formed by printing (or jetting) a photocurable adhesive ink on a lower substrate on which the spacer is formed through an inkjet process, FIG. 1D shows that the adhesive layer formed on the lower substrate is irradiated with light, FIG. 1E shows that the upper substrate is attached to the upper part of the lower substrate, specifically, the upper part of the adhesive layer formed on the lower substrate, and FIG. 1F shows that the upper substrate and the lower substrate are laminated.

Hereinafter, with reference to FIGS. 1A-F, the substrate adhering method according to the present invention will be described step by step. Specifically, the step (a) of printing the first photocurable adhesive ink on the lower substrate to form a pattern may be performed by printing a photocurable adhesive ink, which is discharged through the head of a printer, onto a lower substrate (10), forming a pattern with dots, wherein the dots means droplets formed on a substrate by discharging a photocurable adhesive through a head in a printing process.

The lower substrate (10) may be made of a transparent material such as a glass or a film used as a display substrate or may be made of an opaque material such as a color filter (CF), a black matrix (BM), a thin film transistor (TFT) or a silicon wafer. The substrate may be made of a material suitable for inter-substrate lamination by photocuring, and may be properly selected depending on the purpose for which the substrate is used. In accordance with the purpose of the present invention an opaque substrate is more preferable. On the other hand, the opaque materials used as the lower substrate (10) may be those prepared by forming patterned materials on a glass substrate.

The first photocurable adhesive ink may include ordinary components without limitation, but preferably comprise an epoxy compound, a photopolymerization initiator, a surfactant, a light stabilizer and a solvent, and may further comprise at least one of a corrosion inhibitor and a pH adjuster in addition to the above components. In addition, the first photocurable adhesive ink may be an ink for UV (ultraviolet) curing or electron beam curing, preferably for UV curing.

Meanwhile, the pattern formed in the step (a) may be a dot pattern, a line pattern, or a mixture of a dot pattern and a line pattern. By maintaining the shape of the pattern, a spacer (20) or a dam, which is formed by a line pattern formed by connecting dot, is formed and may be kept in its original shape since the photocurable adhesive ink shows little shrinkage after curing. However, depending on the viscosity or the surface tension, if the curing is not carried out immediately after the droplet is discharged, a slight spreading may occur. And if the curing is carried out immediately after the droplet discharging, the original shape can be maintained without any error.

In addition, when the pattern is formed, the arrangement and shape of the pattern can be adjusted so as to facilitate the discharge of air in the final stage of laminating an upper substrate (40). That is, the pattern may be formed by controlling the dot diameter, dot height and dot pitch during the printing in the step (a), and it may be controlled by adjusting the composition of the photocurable adhesive ink or the like.

The dot pitch during printing in the step (a) may be about 20 to 100 μm based on the ink discharge amount of 10 to 80 pL as described above, and may be different depending on the ink discharge amount. As the ink drop size of the ink head increases, the amount of ink ejected at a time increases, and the dot interval must be further increased to eject a larger amount of ink. For example, when the ink discharge amount is 10 pL, the dot interval is 20 to 35 μm, preferably about 30 μm, and when the ink discharge amount is 30 pL, the dot interval is 40 to 60 μm, preferably about 55 μm. When the ink discharge amount is 50 pL, the dot interval is 50 to 80 μm, preferably about 70 μm, and when the ink discharge amount is 80 pL, the dot interval is 65 to 100 μm, preferably about 90 μm.

Next, the step (b), that is the step of photocuring the pattern to form the spacer (20) on the lower substrate (10) is described. The photocuring may be variously performed depending on the type of the photocurable adhesive ink used in step (a), and may be ultraviolet (UV) curing or electron beam (E-beam) curing, and preferably may be UV curing. The ultraviolet curing may be performed by conventional ultraviolet curing methods, but is preferably performed by applying UV light for 5 to 500 seconds at an intensity of 50 to 500 mW/cm$^2$. Further, the electron beam curing may be performed by applying an electron beam for 5 to 500 seconds. Meanwhile, as described above, it is preferable that the pattern is cured only by a photocuring method, but it is also possible to cure by a combination of photocuring/thermosetting mixing method in which the photocuring method and the thermosetting method are mixed. In this case, first, a small amount of light may be applied to form cations, and then heat may be applied to accelerate the curing rate.

The spacer (20) serves as a support for adhering the lower substrate and the upper substrate at uniform intervals, may have a shape such as a circle or a square, and may have the same shape and size as the pattern (i.e., dot pattern or line pattern) of the adhesive ink formed in the step (a). The thickness (height) of the spacer (20) is 3 to 12 μm, preferably 5 to 11 μm. If the thickness of the spacer (20) is less than 3 μm, the formation of the spacer is difficult and the role as a support may be incomplete. And if it exceeds 12 μm, it may be difficult to form the adhesive layer thinly.

In order to form the spacer (20) to have the above thickness, it is necessary to set an appropriate pixel (px) in the design of the printing image. For example, in order to form the spacer (20) to a thickness of about 10 μm, it is preferable to be set to about 12×12 to 16×16 pixels in the printing image design. At this time, when the size of the pixel is smaller than the above range, there may occur a problem that the discharge amount of the ink is not sufficient and the thickness of the spacer is thinner than the target thickness. If the size of the pixel exceeds the range, there is a possibility that the discharge amount of the ink is excessive, and the thickness of the spacer is thicker than the target thickness. That is, in the case of the above example, when it is intended to form a spacer having a thickness of about 10 μm, if the size is less than 12×12 pixels, a discharge amount of ink is not sufficient and a spacer having a thickness less than 10 μm may be formed. If it exceeds 16×16 pixels, the discharge amount of ink becomes excessive, and a spacer having a thickness exceeding 10 μm may be formed.

In addition, the dot pitch of the spacer (20) should be adjusted to be 0.1 to 1 cm (1,000 to 10,000 μm), preferably 0.2 to 0.5 cm, in order to form a uniform adhesive layer. When the spacing of the spacers (20) is less than 0.1 cm, superposition may occur at the time of forming the spacers or it may be difficult to remove the bubbles formed between the spacers. When the spacing of the spacers (20) is more than 1 cm, the upper substrate (40) located above the spacers is sagged (stretched) between the spacers (20), and this may cause the air bubbles to aggregate to one side.

Meanwhile, the lower substrate (10) may further include a dam (partition pattern, not shown) disposed on the outer periphery of the spacer (20) in addition to the spacer (20) to prevent the adhesive ink from deviating (overflowing) to the outside of the adhesive surface. In addition, there may be formed in the dam at least one bubble outlet for discharging bubbles generated when the upper and lower substrates are bonded. Throughout the bubble outlet, the excess adhesive may be discharged to the outside when performing the step (c) described below.

The bubble outlet may be formed at the side or edge of the dam without limitation in the position and the number of bubbles, but it is preferable that the bubble outlet is formed at the corner so that the bubbles inside can be discharged more easily. Therefore, it is preferable that the bubble outlet of the dam is formed in one to four corners only, but it may be formed more than four, since it can be formed in a portion other than the corner. Also, the bubble outlet may be designed and formed when designing the dam.

The thickness (height) of the dam may be also equal to the thickness of the spacer (20), and is 3 to 12 µm, preferably 5 to 11 µm. If the thickness of the dam is less than 3 µm, the dam may be difficult to be formed and may function incompletely. If the thickness of the dam exceeds 12 µm, it may be difficult to form the adhesive layer thin. In order to form the dam to have the thickness falling under the above range, it is desirable to set an appropriate pixel (px) at the time of designing a printing image, and it is preferable to set the width of the pixel to about 12 to 16 pixels. Meanwhile, Korean Patent Application No. 10-2016-0046172 (a method of adhering a substrate and a substrate for displays manufactured by the same) by the present applicant can be referred to for a more detailed description of the dam.

Subsequently, in step (c), the adhesive layer (30) is formed, in conformity with the height of the spacers (20) formed in the step (b), by printing a second photocurable adhesive ink on the upper surface of the lower substrate (10) on which the spacer (20) is formed. Since the adhesive layer (30) is formed in conformity with the height of the spacer (20) formed in the printing process, it is uniformly formed with a small thickness so that the alignment between the lower substrate 10 and the upper substrate 40 can become uniform.

Like the first photocurable adhesive ink of the step (a), the second photocurable adhesive ink can contain ordinary components without limitation. The second photocurable adhesive ink may preferably comprise an epoxy compound, a photopolymerization initiator, a surfactant, a light stabilizer, and a solvent, and may further comprise at least one of a corrosion inhibitor and a pH adjuster in addition to the above components. In addition, the second photocurable adhesive ink may be a UV curing ink or an electron beam curing ink, and may be preferably UV curing ink.

The thickness of the adhesive layer (30) is 3 to 12 µm, preferably 5 to 11 µm, corresponding to the thickness (height) of the spacer (20), and the photocurable adhesive used in this step may be the same as the adhesive used in the step (a), and also the dot pitch at the time of printing in the step (c) may be the same as the dot pitch in the step (a). If the dot pitch of the step (c) is out of the range of dot pitch based on the ink discharge amount, for example, if the amount of ink applied to the entire surface of the adhesive layer (30) is excessively overflowed, adhesion may occur even in an undesired portion. Or, if the amount of the ink to be applied is too small when the adhesive layer (30) is formed, the upper substrate (40) may not adhere well. Meanwhile, the dot pitch in step (a) is an interval for the pattern formation, and the dot pitch in step (c) is an interval for the adhesive layer (30) formation.

Next, the step (d) may include irradiating the adhesive layer (30) formed on the lower substrate (10) with light, more specifically, irradiating the adhesive layer (30) with light so that the photopolymerization initiator contained in the adhesive layer (30) is activated to generate cations. In the step (d), even if the lower substrate (10) is made of an opaque material, the transmittance of the irradiated light is facilitated to partially cure the adhesive layer of the lower substrate, so that the lower substrate and the upper substrate are bonded, which is the principal technique of the present invention.

As described above, when the transparent substrate is used as the display substrate, the lower substrate (more precisely, the adhesive layer formed on the lower substrate) and the upper substrate can be bonded or laminated by photocuring by light irradiation. However, when the substrate is not transparent, the irradiated light is not normally transmitted, so that the adhesive layer of the lower substrate may not be cured and the lamination of the lower substrate and the upper substrate may also be incomplete.

Accordingly, the present invention has been made to solve the above problems, and it is an object of the present invention to provide a method for completely bonding and laminating upper and lower substrates even when a substrate which is not transparent is used. In other words, in the case of using a transparent substrate, the upper and lower substrates are laminated and then irradiated with light and cured and however, the present invention provides a method of irradiating light and partially curing an adhesive layer of a lower substrate before laminating the upper and lower substrates.

The light irradiation in the step (d) may be by ultraviolet (UV) or electron beam (E-beam), preferably by ultraviolet light. In the case of ultraviolet irradiation, it is preferably performed for 5 to 500 seconds at an intensity of 5 to 50 mW/cm$^2$, and it may be performed for 5 to 500 seconds in the case of electron beam irradiation.

The amount of light irradiated on the adhesive layer (30) is $1/100$ to $1/3$, preferably $1/30$ to $1/10$ of the amount of light irradiated on the pattern in the step (b). The irradiation of a minute amount of light to the adhesive layer (30) is intended to prevent the adhesive layer (30) formed on the lower substrate (10) from completely curing as the light irradiation time is before the bonding of the lower substrate and the upper substrate. Therefore, if the amount of light irradiated to the adhesive layer (30) is less than $1/100$ of the amount of light irradiated to the pattern in the step (b), the quantity of irradiated light is insignificant and the photopolymerization initiator contained in the adhesive layer (30) may not be activated. If the amount of light irradiated to the adhesive layer (30) exceeds $1/3$ of the amount of light irradiated to the pattern in the step (b), the amount of irradiated light is excessive, so that the adhesive layer (30) can be cured before the upper substrate and the lower substrate are laminated.

On the other hand, the amount of light irradiated on the pattern in the step (b) may be different depending on the use of the substrate or the surrounding environment. For example, when the amount of light irradiated on the pattern in step (b) is 300 mJ/cm$^2$, the amount of light irradiated on the adhesive layer (30) may be 3 to 100 mJ/cm$^2$. Further, the intensity (unit: mW/cm$^2$) when irradiating light in the step (d) is adjustable, and the time for irradiating the light in the step (d) may be the same as the time for irradiating the light to the pattern in the step (b), or may be longer or shorter.

Finally, in the step (e), the upper substrate (40) is attached to the adhesive layer (30) of the lower substrate (10) to laminate the upper substrate and the lower substrate. As described above, light irradiation and curing, which are conventionally performed, are not performed in this step. In the step (d), the lower substrate (10) and the upper substrate

(40) are naturally laminated over time by the adhesive layer (30) partially cured by light, or the lower substrate (10) and the upper substrate (40) may be laminated by applying heat (by heat treatment) in order to shorten the time during which both substrates are joined together. Meanwhile, as described above, in order to shorten the laminating time of both substrates, the heat application step may be performed by using a heat medium such as a hot plate or a drying oven at a temperature of 50 to 150° C. for 1 to 100 seconds. However, since most of the OLED elements are sensitive to heat, it is preferable that they are performed at a temperature of 80 to 100° C. using the thermal medium.

In addition, the upper substrate (40) may be made of a transparent material, such as a glass or a film, which is generally used as a display substrate, like the lower substrate (10), or may be made of opaque material such as a color filter (CF), a black matrix (BM), a thin film transistor (TFT), or a silicon wafer. The substrate (40) may be made of a material that may be laminated between substrates by photocuring, and may be appropriately selected and used according to the purpose in which the substrate is used. Accordingly, the upper substrate (40) and the lower substrate (10) are a transparent or opaque substrate(s) and the same or different in the materials. The opaque materials used as the upper substrate (40) may be those prepared by forming patterned materials on a glass substrate.

Figure 2:
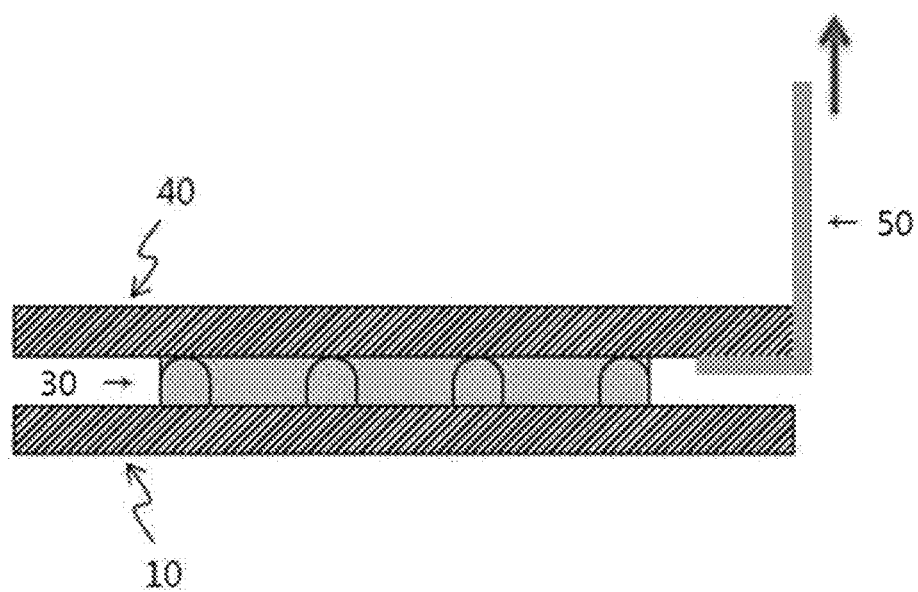
FIG. 2 is a view showing a test of adhesive strength between laminated substrates using a film coated with an adhesive according to an embodiment of the present invention.

On the other hand, the bonding strength between the lower substrate (10) and the upper substrate (40) which are laminated as described above can be tested without particular limitation by a means for confirming the bonding strength between the substrates. FIG. 2 shows testing adhesive strength between bonded substrates using an adhesive-coated film (50) according to one embodiment of the present invention. As shown in FIG. 2, the adhesive strength between the substrates can be tested using the adhesive-coated film (50). First, one end (or one side) of the adhesive coating film is attached to the lower surface of the upper substrate (40), and then the other end of the adhesive coating film (50) is pulled with a constant force while the lower substrate (10) is fixed. The adhesive strength between the substrates (10, 40) can be determined based on whether or not the upper and lower substrates are separated, or how much force is applied when they are separated or not separated.

Meanwhile, the printing process used in the bonding method of the substrate described above may be any one of various printing processes using ink, but an inkjet printing method is most preferable.

In addition, the present invention provides a substrate for displays manufactured by the above-described method for bonding substrates.

Hereinafter, preferred examples of the present invention are described in order to facilitate understanding of the present invention. The following examples are provided for illustrative purposes only and various changes and modifications thereof can be made within the scope and spirit of the present invention, which is apparent to a skilled person in the art. Also, such changes and modifications are intended to fall within the scope of the claims.

[Example 1] Preparation of a Substrate for Displays Using Opaque Substrate(s)—Light Irradiation on the Adhesive Layer Primary inkjet printing are carried out on an opaque color filter to be used as a lower substrate through an SE head (Dimatix, Inc., USA) in which UV adhesive ink is dis- charged in the amount of 30 pL at a time. The dot pattern was formed with a dot pitch of 55 μm (462 dpi) at the time of printing, and the formed dot pattern was completely cured with a 395 nm UV lamp for about 5 seconds (light quantity: 300 mJ/cm$^2$), a spacer having a diameter of 1.3 mm and a thickness of 10 μm was formed. Then, the same UV adhesive ink as the first inkjetting was applied to the entire upper portion of the lower substrate on which the spacers were formed (tilting the inkjet head and performing application) to form an adhesive layer having the same thickness as the spacer of 10 μm. Subsequently, the adhesive layer formed on the lower substrate was irradiated for about 5 seconds using a 395 nm UV lamp to partially cure the adhesive layer (light quantity: 30 mJ/cm$^2$), and after attaching thereto a color filter as an upper substrate, the substrate was heat-treated at a temperature of 90° C. for 10 seconds using a hot plate to manufacture a display substrate having an upper substrate and a lower substrate bonded together.

[Example 2] Preparation of a Substrate for Displays Using Opaque Substrate(s) —Light Irradiation on the Adhesive Layer A substrate for displays was manufactured in the same manner as in Example 1 except that the substrate was heat-treated at a temperature of 80° C. instead of 90° C.

[Example 3] Preparation of a Substrate for Displays Using Opaque Substrate(s) —Light Irradiation on the Adhesive Layer A substrate for displays was manufactured in the same manner as in Example 1 except that the adhesive layer was irradiated with light at a dose of 10 mJ/cm$^2$ instead of 30 mJ/cm$^2$.

[Example 4] Preparation of a Substrate for Displays Using Opaque Substrate(s) —Light Irradiation on the Adhesive Layer A substrate for displays was manufactured in the same manner as in Example 1 except that the thickness of the spacer and the adhesive layer was 5 μm instead of 10 μm.

[Example 5] Preparation of a Substrate for Displays Using Opaque Substrate(s) —Light Irradiation on the Adhesive Layer A substrate for displays was manufactured in the same manner as in Example 1 except that the thickness of the spacer and the adhesive layer was 5 μm instead of 10 μm, and the amount of light which the adhesive layer was irradiated with was 10 mJ/cm$^2$ instead of 30 mJ/cm$^2$.

[Example 6] Preparation of a Substrate for Displays Using Opaque Substrate(s) —Light Irradiation on the Adhesive Layer A substrate for displays was manufactured in the same manner as in Example 1 except that the upper substrate was a silicon wafer.

[Example 7] Preparation of a Substrate for Displays Using Opaque Substrate(s) —Light Irradiation on the Adhesive Layer A substrate for displays was manufactured in the same manner as in Example 1 except that the lower substrate was a silicon wafer.

[Example 8] Preparation of a Substrate for Displays Using Opaque Substrate(s) —Light Irradiation on the Adhesive Layer A substrate for displays was manufactured in the same manner as in Example 1 except that the upper substrate and the lower substrate were both silicon wafers.

[Comparative Example 1] Preparation of a Substrate for Displays Using Opaque Substrate(s)

The same procedure as in Example 1 was conducted except that the adhesive layer was heat-treated for 3 hours without irradiation of light, thereby attempting to bond the upper and lower substrates together for manufacturing a display substrate.

[Comparative Example 2] Preparation of a Substrate for Displays Using Opaque Substrate(s)

The same procedure as in Example 1 was conducted except that the thickness of the spacer and the adhesive layer was 5 μm instead of 10 μm, the adhesive layer was not irradiated with light and the heat treatment was performed for 3 hours, thereby attempting to bond the upper and lower substrates together for manufacturing a display substrate.

[Comparative Example 3] Preparation of a Substrate for Displays Using Opaque Substrate(s)

The same procedure as, in Example 1 was conducted except that the upper substrate was a silicon wafer and the adhesive layer was heat-treated for 3 hours without irradiation of light, thereby attempting to bond the upper and lower substrates together for manufacturing a display substrate.

[Comparative Example 4] Preparation of a Substrate for Displays Using Opaque Substrate The same procedure as in Example 1 was conducted except that the upper substrate was a silicon wafer and the adhesive layer was photocured at 300 mJ/cm² without irradiation of light, thereby attempting to bond the upper and lower substrates together for manufacturing a display substrate.

[Example 1-8 an Comparative Example 1-4] Evaluation of Adhesive Strength Between Upper and Lower Substrates for the Production of a Substrate for Displays The adhesion strength between the upper substrate and the lower substrate bonded together according to Examples 1 to 8 and Comparative Examples 1 to 4 was evaluated, and the results were shown in Table 1 below. In the adhesion test between the upper and lower substrates, one end of an adhesive-coated film having 25 mm of width and 75 mm of length was attached to the lower surface of the upper substrate, and while the lower substrate was fixed using a Texture Analyzer (manufactured by TA Corporation), a force was applied to the other end of the film (i.e., 90° adhesion test).

In Table 1 below, the symbol "○" indicates that the upper and lower substrates were not separated even when applying about 1,000 gf/cm² because the adhesion between both substrates was good, and the symbol "x" indicates that the upper and lower substrates were separated before applying 1,000 gf/cm² because the adhesion between both substrates was not good.

TABLE 1

| | thickness of a adhesive layer (μm) | amount of light irradiated on a adhesive layer (mJ/cm²) | temperature and time of heat treatment | adhesion between upper and lower substrates |
|---|---|---|---|---|
| Example 1 | 10 | 30 | 90° C./10 sec | ○ |
| Example 2 | 10 | 30 | 80° C./10 sec | ○ |
| Example 3 | 10 | 10 | 90° C./10 sec | ○ |
| Example 4 | 5 | 30 | 90° C./10 sec | ○ |
| Example 5 | 5 | 10 | 90° C./10 sec | ○ |
| Example 6 | 10 | 30 | 90° C./10 sec | ○ |
| Example 7 | 10 | 30 | 90° C./10 sec | ○ |
| Example 8 | 10 | 30 | 90° C./10 sec | ○ |
| Comparative Example 1 | 10 | — | 90° C./3 hr | x |
| Comparative Example 2 | 5 | — | 90° C./3 hr | x |
| Comparative Example 3 | 10 | — | 90° C./3 hr | x |
| Comparative Example 4 | 10 | — | photocuring 300 mJ/cm² | x |

As shown in Table 1, in Examples 1 to 5 in which light was irradiated onto the adhesive layer on the lower substrate before the upper and lower substrates were mutually adhered, the upper substrate and the lower substrate were stably bonded and laminated. In Comparative Examples 1 and 2 in which the lower substrate was an opaque substrate as in Examples 1 to 5 but the adhesive layer on the lower substrate was not irradiated with light, the upper substrate and the lower substrate were separated. In addition, in Examples 6 to 8 in which the upper substrate and/or the lower substrate were silicon wafers and the adhesive layer on the lower substrate was irradiated with light before the upper and lower substrates were mutually adhered, the upper substrate and the lower substrate stably adhered to each other. However, in Comparative Examples 3 and 4 in which the upper substrate was a silicon wafer and the adhesive layer on the lower substrate was not irradiated with light, the upper substrate and the lower substrate were separated. Based on the results, it was confirmed that it is possible to manufacture a display substrate using an opaque substrate by irradiating light to the adhesive layer on the lower substrate.

What is claimed is:
1. A method for bonding substrates, comprising:
    (a) printing a first photocurable adhesive ink on a lower substrate to form a pattern;
    (b) photocuring the pattern to form a spacer on the lower substrate;
    (c) printing a second photocurable adhesive ink on the lower substrate, which includes the spacer disposed thereon, to form an adhesive layer, wherein the first and second photocurable adhesive inks are the same or different;
    (d) irradiating the adhesive layer with light; and
    (e) laminating an upper substrate to the lower substrate via the irradiated adhesive layer to form bonded substrates comprising the upper substrate, the lower substrate, the adhesive layer, and the spacer, wherein the upper and lower substrates are spaced apart by the height of the spacer, wherein each of the upper and lower substrates is transparent or opaque, and wherein the upper and lower substrates comprise same or different materials.

2. A method for bonding substrates according to claim 1, wherein the lower substrate is a transparent glass or transparent film, or an opaque substrate selected from the group consisting of a color filter, a black matrix (BM), a thin film transistor (TFT), and a silicon wafer.

3. A method for bonding substrates according to claim 1, wherein the adhesive layer of the step (d) is irradiated with light to partially cure the adhesive layer.

4. A method for bonding substrates according to claim 1, wherein the amount of light irradiated on the adhesive layer is 1/100 to 1/3 of an amount of light used to photocure the pattern in the step (b).

5. A method for bonding substrates according to claim 1, wherein the step (e) further comprises:
heat treating the upper and lower substrates to reduce the laminating time.

6. A method for bonding substrates according to claim 5, wherein the heat treatment of the step (e) is performed using a hot-plate or a drying oven at a temperature of 50° C. to 150° C. for 1 to 100 seconds.

7. A method for bonding substrates according to claim 1, wherein the upper substrate is a transparent glass or transparent film, or an opaque substrate selected from the group consisting of a color filter, a black matrix (BM), a thin film transistor (TFT), and a silicon wafer.

8. A method for bonding substrates according to claim 1, wherein the thickness of the adhesive layer is 3 to 12 μm.

9. A method for bonding substrates according to claim 1, wherein the pattern of step (b) is cured only by photocuring or by a combination of photocuring and heat treatment, wherein the heat treatment accelerates a curing rate after cations are formed by photocuring.

10. A method for bonding substrates according to claim 9, wherein the photocurable adhesive ink is an ultraviolet (UV) curing ink or an electron beam curing ink.

11. A method for bonding substrates according to claim 1, wherein the photocuring in the step (b) further comprises:
irradiating the pattern with ultraviolet (UV) light for 5 seconds to 500 seconds at an intensity of 50 mW/cm$^2$ to 500 mW/cm$^2$, or irradiating the pattern with an electron beam for 5 seconds to 500 seconds.

12. A method for bonding substrates according to claim 1, wherein step (d) further comprises:
irradiating the adhesive layer with ultraviolet (UV) light for 5 seconds to 500 seconds at an intensity of 5 mW/cm$^2$ to 50 mW/cm$^2$, or irradiating the adhesive layer with an electron beam for 5 seconds to 500 seconds.

13. A method for bonding substrates according to claim 1, wherein the printing in steps (a) and (c) is inkjet printing.

14. A substrate for displays manufactured by the method according to claim 1.

* * * * *